(12) United States Patent
Meyer

(10) Patent No.: US 6,455,844 B1
(45) Date of Patent: Sep. 24, 2002

(54) SINGLE-ATOM DETECTION OF ISOTOPES

(75) Inventor: Fred W. Meyer, Oak Ridge, TN (US)

(73) Assignee: Lockheed Martin Energy Research, Oak Ridge, TN (US)

(*) Notice: Subject to any disclaimer, the term of this patent is extended or adjusted under 35 U.S.C. 154(b) by 0 days.

(21) Appl. No.: 09/397,153

(22) Filed: Sep. 15, 1999

(51) Int. Cl.[7] .......................... H01J 49/00; B01D 59/44
(52) U.S. Cl. ....................................... 250/281; 250/282
(58) Field of Search ............................. 250/281, 396 R, 250/282; 313/359.1, 361.1, 363.1

(56) References Cited

U.S. PATENT DOCUMENTS

| 4,489,237 A | | 12/1984 | Litherland et al. ........... 250/287 |
| 4,830,010 A | | 5/1989 | Marshall ...................... 128/630 |
| 5,528,034 A | * | 6/1996 | Yamazaki et al. ........... 250/309 |
| 5,621,209 A | | 4/1997 | Purser ......................... 250/296 |
| 5,661,299 A | | 8/1997 | Purser ......................... 250/281 |

OTHER PUBLICATIONS

"Electron Cyclotron Resonance Multiply Charged Ion Sources", R. Geller, Apr. 1979, vol NS–26, No 2, Part 1, IEEE Nuclear and Plasma Sciences Society, pp. 2120–2127.
"Accelerator Mass Spectrometry for Measurement of Long–Lived Radioisotopes", David Elmore & Fred M. Phillips, Science, May 1, 1987, vol. 236, No. 4801, p. 500, 543–550.
"Nanogan II 14.5 GHz: a compact ECRIS for on line production of multicharged radioactive ion beams for Spiral", L. Maunoury, et al., Proceedings of 13th Int'l. Workshop on ECR Ion Sources, Feb. 26–28, 1997, College Station, Texas (Hosted by Cyclotron Institute, Texas A&M University).
"Time Scales for Charge Equilibration of $O^{q+}$ ($3 \leq q \leq 8$) Ions during Surface–Channeling Interactions with Au (110)", L. Folkerts et al, Physical Review Letters (The American Physical Society), Mar. 20, 1995, vol. 74, No. 12, p. 2204–2207.
"AMS Beyond 2000", Jay C. Davis, Nuclear Instruments and Methods in Physics Research, Beam Interactions with Materials & Atoms, vol. 92, 1994.
"On the Neutralization of Singly and Multicharged Projectiles During Grazing Interactions With LiF(100)", F.W. Meyer et al., Nuclear Instruments and Methods in Physics Research, Beam Interactions with Materials & Atoms, vol. 125, 1997.

* cited by examiner

Primary Examiner—Bruce Anderson
Assistant Examiner—Zia R. Hashmi
(74) Attorney, Agent, or Firm—Gray Cary Ware & Freidenrich

(57) ABSTRACT

A method for performing accelerator mass spectrometry, includes producing a beam of positive ions having different multiple charges from a multicharged ion source; selecting positive ions having a charge state of from +2 to +4 to define a portion of the beam of positive ions; and scattering at least a portion of the portion of the beam of positive ions off a surface of a target to directly convert a portion of the positive ions in the portion of the beam of positive ions to negative ions.

20 Claims, 1 Drawing Sheet

SINGLE-ATOM DETECTION OF ISOTOPES

STATEMENT AS TO RIGHTS TO INVENTIONS MADE UNDER FEDERALLY-SPONSORED RESEARCH AND DEVELOPMENT

This invention was made with Government support under contract No. DE-AC05-96OR22464 awarded by the United States Department of Energy to Lockheed Martin Energy Research Corporation, and the Government has certain rights in this invention.

BACKGROUND OF THE INVENTION

1. Field of the Invention

The invention relates generally to the field of accelerator mass spectrometry. More particularly, the invention relates to accelerator mass spectrometers employing a multicharged ion source.

2. Discussion of the Related Art

The main difficulty in single atom detection of C-14 arises from the isobaric interferences due to N-14 atomic ions and $^{12}CH_2$ and $^{13}CH$ molecular ions. In conventional accelerator mass spectrometry (AMS) the approach consists of using a negative ion source to eliminate the $^{14}N$ contamination, since it does not support a stable negative ion, accelerating the negative ion beam in a tandem accelerator to high energy (few MeV), and then dissociating molecular ions isobaric with $^{14}C^-$ also present in the ion beam either in a foil or gas target. Subsequent stages of electrostatic and magnetic analysis are then used to isolate the $^{14}C$ ions prior to their detection. Conventional AMS requires large, nuclear physics scale facilities, with correspondingly high cost, which are usually not dedicated to a single task, and entails time consuming sample preparation prior to the actual measurements, and so is not suited to quasi-real time monitoring Of C-14 levels.

SUMMARY OF THE INVENTION

The invention includes an apparatus and method for the detection of carbon-14 and other rare isotopes where molecular ion isobaric interferences are a problem, and where interfering atomic isobars do not form stable negative ions. In this invention, large nuclear physics scale facilities such as used in conventional accelerator mass spectrometry (AMS), for example, are not needed.

These, and other, goals and embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiment illustrated in the drawing accompanying and forming a part of this specification.

DESCRIPTION OF PREFERRED EMBODIMENTS

The invention and the various features and advantageous details thereof are explained more fully with reference to the nonlimiting embodiments that are illustrated in the accompanying drawings and detailed in the following description of preferred embodiments. Descriptions of well known components and processing techniques are omitted so as not to unnecessarily obscure the invention in detail.

Within this application several publications are referenced by Arabic numerals within parentheses. Full citations for these, and other, publications may be found at the end of the specification immediately preceding the claims after the section heading References. The disclosures of all these publications in their entireties are hereby expressly incorporated by reference into the present application for the purpose of indicating the background of the invention and illustrating the state of the art.

The below-referenced U.S. Patents disclose embodiments that were satisfactory for the purposes for which they were intended. The entire contents of U.S. Pat. Nos. 4,489,237; 5,661,299; 5,621,209; and 4,830,010 are hereby expressly incorporated by reference into the present application as if fully set forth herein.

Figure 1A:
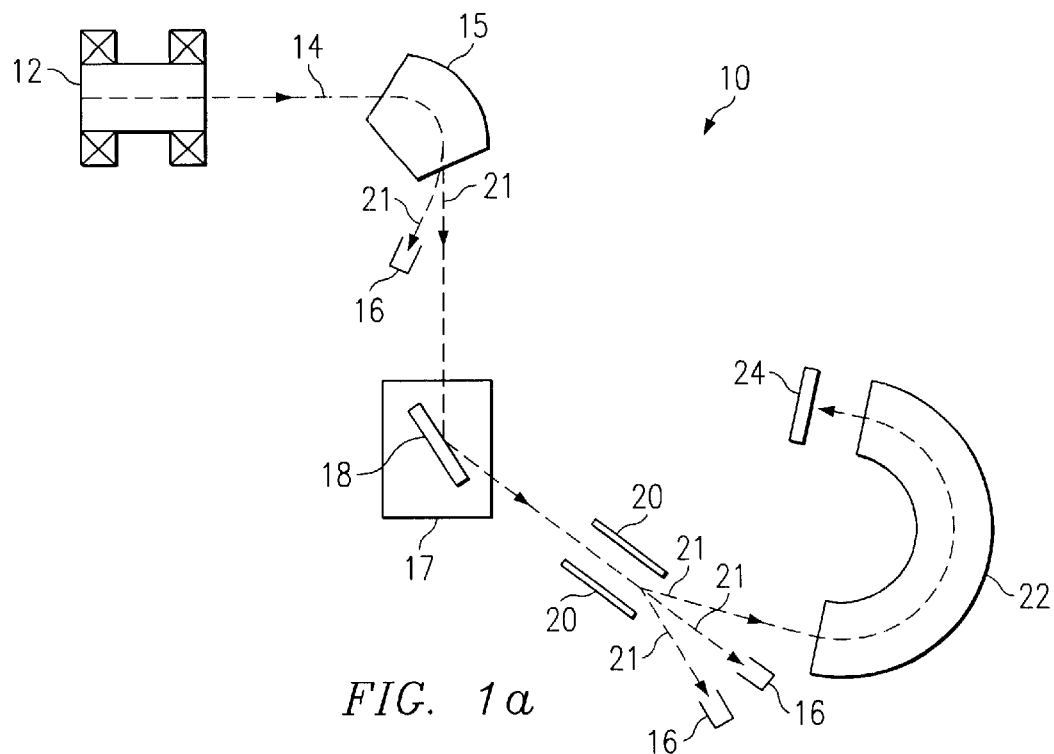
FIG. 1a illustrates a high level schematic view of an accelerator mass spectrometry apparatus, representing an embodiment of the invention.

FIG. 1a illustrates an embodiment of an apparatus 10 according to the invention. The apparatus 10 includes multicharged ion source 12 for the production of a multicharged ion beam 14. Suitable multicharged ion sources include, but are not limited to, an electron cyclotron resonance (ECR) ion source. An ECR ion source 12 contains a high-temperature electron plasma which is very efficient in removing electrons from source atoms to form multiply charged positive ions. If mass-14 ions are extracted from the ECR plasma in sufficiently high charge states, one is assured that there will be no molecular species in the extracted multicharged ion beam 14, since the loosely bound electrons forming the relevant chemical bonds of the molecule will have been removed, leading to immediate breakup of the molecule into smaller mass fragments. During operation of the apparatus 10, the ECR preferably produces a multicharged ion beam 14 with a charge state which is high enough to eliminate molecular isobar interference. The charge state is preferably at least +2, and more preferably at least +3.

In addition to facilitating removal of one of the isobaric interferences, a further advantage of using an multicharged ion source such as an ECR source 12 is very high ionization efficiency. Stable C beams with ionization efficiencies as high as 24% are achievable for formation of +4 ions. For low abundance isotopic species, this value is reduced about a factor of two due to adsorption on the source chamber wall. However, the use of a hot liner can reduce wall adsorption, and result in values very close to that obtained for the corresponding stable isotope.

After the multicharged ion beam 14 is extracted from the multicharged ion source 12 and accelerated to energies in the keV range, the beam 14 passes to an analyzing magnet 15 where the ions are separated into different regions according to their mass-14 charge state. The ions in different regions can be processed independently of one another. For instance, the ions in one region can be received by a detector 16 for monitoring the C-12 intensity for reference purposes and the ions in another region can be selected for further processing by the apparatus. The charge state for the selected ions is preferably at least +2, more preferably +3, and most preferably +4 to maximize ionization efficiency. The beam 14 from the analyzing magnet 15 will be completely free of any interfering molecular isobars, but will still contain a strongly dominant $^{14}N$ component of the same charge state.

The beam 14 from the analyzing magnet 15 enters a UHV chamber 17 where the beam 14 is incident upon a target surface 18 at a grazing angle of incidence for the formation of negative ions. The angle of incidence is preferably at most approximately 5° (e.g. from approximately 1° to approximately 5.0°), but depends on the energy of the multicharged ion beam. Suitable target surfaces 18 include, but are not limited to, a metal or insulator high quality single crystal. With a LiF (100) target, very high efficiency for converting incident multicharged O and F projectiles into scattered negative ions can be obtained, that is essentially independent of incident charge state. Maximum efficiencies for converting incident $C^{4+}$ to $C^-$ are estimated to be in the 50% range. Operating the insulator target surface at high temperature where the ionic conductivity will be sufficiently high will ameliorate sample-charging effects due to impact of the high intensity ion beam 14. Alternatively a single crystal metal target can be used, with a concomitant decrease of negative ion yield of about an order of magnitude, but having the same feature of the negative ion yield being independent of incident charge state. This feature is a key one, in that it permits the choice of charge state to be determined solely on the basis of maximum ionization efficiency. Since specular reflection conditions apply, the scattered beam 14 will still have low divergence, small size, and very close to its original energy.

The scattered beam 14 passes from the target 18 to a first (primary) electrostatic analyzer 20 to disperse the different scattered charge states. The different scattered charge states can be dispersed into different regions 21. The different regions 21 can be discrete or can overlap. Suitable first electrostatic analyzers 20 include, but are not limited to, low resolution electrostatic analyzers and low resolution deflection plates.

The ions in the zone 21 receiving the charge state of interest pass to a second (secondary) electrostatic analyzer 22 which further spatially separates the desired $^{14}C^-$ ions from other scattered charge states. The secondary analyzer can provide high resolution. For instance, the negative ion component of the beam 14 can be further separated from the other scattered charge states to further reduce background and discriminate against other negative ions of different energy (e.g. $^{28}Si^-$ from $^{28}Si^{8+}$ having the same mass to charge ratio as the $^{14}C^{4+}$ ions extracted from the ECR source 12). The negative ion component of the beam 14 will not exhibit interference from $^{14}N$ due to the instability of $^{14}N$ as a negative ion. The second electrostatic analyzer 22 preferably has a higher resolution than the first electrostatic analyzer 20. Suitable second electrostatic analyzers 22 include, but are not limited to cylindrical or hemispherical analyzers. The beam 14 from the second electrostatic analyzer 22 is received by a particle detector 24 such as a channel electron multiplier or multichannel plate, which may be position sensitive.

Figure 1B:
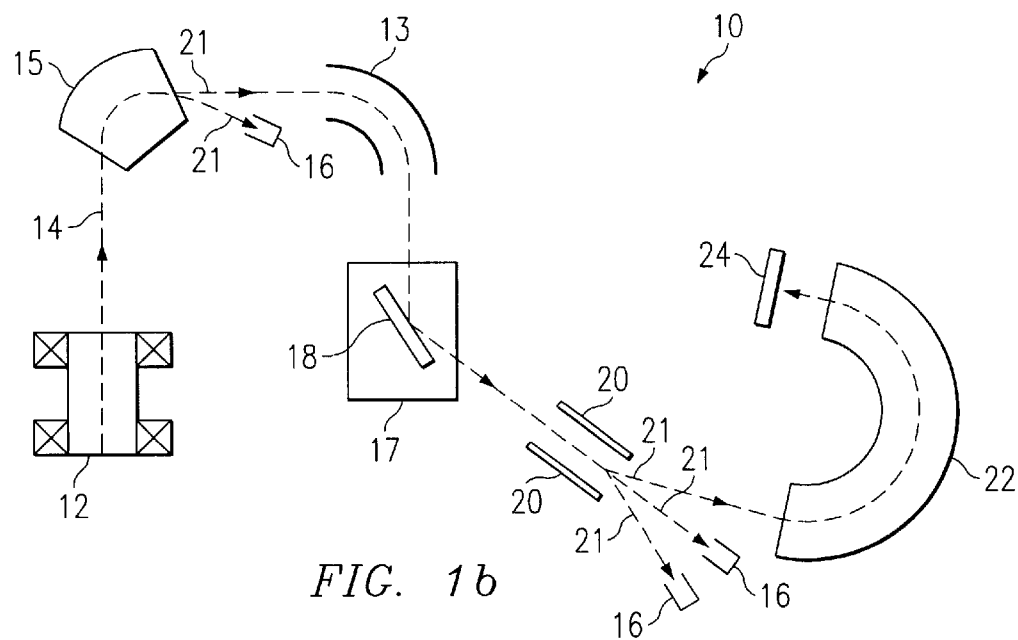
FIG. 1b illustrates a high level schematic view of another accelerator mass spectrometry apparatus, representing an embodiment of the invention.

FIG. 1b illustrates an alternative embodiment of the apparatus 10 according to the invention. This embodiment of the apparatus adds an electrostatic analysis apparatus 13 prior to the surface scattering stage to remove possible contamination due to charge exchange of the extracted beams with residual gas prior to magnetic analysis. As depicted, the electrostatic analysis apparatus involves turning an additional turn of the beam 14.

In place of the beam/solid target negative ion formation process, a gas cell could be introduced in which multiple electron capture could occur to form the fast neutrals, followed by a second gas cell for negative ion formation. If a suitable gas could be found, the two steps could be performed in a single gas cell. Any approach involving gas phase collisions for the neutralization of the multicharged ions and negative ion formation will have much lower efficiency than the ion-target surface interaction process.

In place of the ECR ion source 12, other ion sources of low energy multicharged ions could, in principle, be employed. But at present only the ECR source 12 combines the high ionization efficiency and beam intensity characteristics required for this apparatus 10.

This invention can in principle be used for detection of other rare isotopes where molecular ion isobaric interferences are a problem, and where interfering atomic isobars do not form stable negative ions, provided the specie of interest can be formed in a charge state sufficiently high that the interfering molecular ion is no longer stable.

The apparatus 10 has value within the technological arts. As medical diagnostic, for measurements of in vivo $^{14}C$ uptake related to detection of cancer or other pathologies, for biomedical research into oral availability of drugs or transport across cell membranes, for radiocarbon dating applications in the areas of paleoclimatology and archaeology, for tracer studies of atmospheric chemistry and transport, ocean mixing, erosional processes and glacial recession, diffusion through soils, as diagnostic in studies of diesel exhaust pollution, lubricant consumption and degradation, wear analyses of graphite composite materials, and of various petroleum industry problems (see Ref. 10). There are virtually innumerable uses for the invention, all of which need not be detailed here.

The ion-target surface interaction process described above (see also Ref. 8 and 9) essentially combines two steps: neutralization of the multicharged C ions and negative ion formation. This results in simplicity, compactness of design and low cost. Additionally, the apparatus 10 requires voltages in the range 5–20 kV in contrast to the conventional approaches (Ref. 1 and 3) which can require at least a factor of 100 higher voltages. The reduced voltage requirements can also translate into increased simplicity, compactness and reduced cost. Additionally, the compact ECR source 12 (Ref. 7) combined with the highly efficient process for converting multicharged positive ions to negative ions (Ref. 7 and 8) provides an increased efficiency and throughput than those obtained with existing approaches.

The difficulty of sample preparation is substantially reduced in the invention as compared to conventional accelerator mass spectrometry (AMS) hardware. In previous approaches the samples had to be converted off line to solid pellets (Ref. 1) that could be inserted into a negative ion sputter source. The present scheme can use samples in gaseous (see Ref. 5) form directly (Ref. 6 and 7). Together with the highly efficient compact ECR source 12 and method for converting multicharged positive ions to negative ions, this makes possible much faster processing times, and opens the possibility of quasi real-time monitoring.

The apparatus 10 can also provide an increased sensitivity above what can be achieved with conventional biomedical tracer measurement methods. This increased sensitivity permits usage of lower radioactive tracer levels, with corresponding positive environmental, health and safety, and financial impacts.

Because of the above advantages, this apparatus 10 should find great utility in quasi-real time monitoring of C-14 based chemical tracer uptake in biological systems for the purposes of atmospheric pollution studies, cancer research, medical diagnostics, or other biomedical studies.

The term "approximately", as used herein, is defined as at least close to a given value (e.g., preferably within 10% of, more preferably within 1% of, and most preferably within 0.1% of). The term "substantially", as used herein, is defined as at least approaching a given state (e.g., preferably witin 10%, more preferably within 1% of, and most preferably within 0.1% of). The term "coupled", as used herein, is defined as connected, although not necessarily directly, and not necessarily mechanically.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the components of the apparatus described herein can be constructed from physically separate modules, it will be manifest that any two or more of the components may be integrated into a single modules. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended subclaims.

REFERENCES

1. D. Elmore and F. M. Phillips, Science 236, 543 (1987).
2. U.S. Pat. No. 4,489,237: Method of broad band mass spectrometry and apparatus therefor.
3. U.S. Pat. No. 5,661,299: Miniature AMS detector for ultrasensitive detection of individual carbon-14 and tritium atoms.
4. U.S. Pat. No. 5,621,209: Attomole detector.
5. U.S. Pat. No. 4,830,010: Methods for the diagnosis of gastrointestinal disorders.
6. R. Geller and B. Jacquot, Physica Scripta T3 (1983); R. Geller, IEEE Trans. Nucl. Sci. NS-26, 2120 (1979).
7. L. Maunoury et al., Proc. 13th Int. Workshop on ECR Ion Sources, D. May, ed., Texas A&M, 26–28 February 1997.
8. L. Folkerts, S. Schippers, D. M. Zehner, and F. W. Meyer, Phys. Rev. Lett. 74, 2204 (1995). FIG. 3.
9. F. W. Meyer, Q. Yan, P. Zeijlmans van Emmichoven, I. G. Hughes, and G. Spierings, NIMB 125, 138 (1997). FIG. 12.
10. J. C. Davis, NIMB 92, 1 (1994).

What is claimed is:

1. An accelerator mass spectrometry apparatus, comprising:
    a multicharged ion source for producing a beam of positive ions having different multiple charges;
    a selector coupled to the multicharged ion source, the selector configured to select positive ions having a charge state of from +2 to +4 from the beam of positive ions to define a portion of the beam of positive ions; and
    a target coupled to said multicharged ion source, said target having a surface from which at least a portion of the beam of positive ions can be scattered and directly converted to negative ions.

2. The accelerator mass spectrometry apparatus of claim 1, wherein the multicharged ion source includes an electron cyclotron resonance ion source.

3. The accelerator mass spectrometry apparatus of claim 2, wherein the electron cyclotron resonance ion source is configured and operated under appropriate conditions to provide ions having a charge state of at least +3.

4. The accelerator mass spectrometry apparatus of claim 1, wherein the selector includes: an analyzing magnet between said multicharged ion source and said target, said analyzing magnet configured to select positive ions having a charge state of at least +3 from the beam of positive ions produced by the multicharged ion source.

5. The accelerator mass spectrometry apparatus of claim 4, wherein the analyzing magnet is configured to select positive ions having a mass 14 charge state of at least +3.

6. The accelerator mass spectrometry apparatus of claim 1, further comprising:
    a primary electrostatic analyzer coupled to said target, said primary electrostatic analyzer receiving at least a portion of negative ions from the surface of the target and dispersing negative ions having different charge states into different regions.

7. The accelerator mass spectrometry apparatus of claim 6, further comprising:
    a secondary electrostatic analyzer coupled to said primary electrostatic analyzer, said secondary electrostatic analyzer receiving at least a portion of those ions having negative charge as dispersed by the first electrostatic analyzer and further dispersing those ions received from the primary electrostatic analyzer according to their kinetic energy.

8. The accelerator mass spectrometry apparatus of claim 7, further comprising:
    a particle detector coupled to said secondary electrostatic analyzer, said particle detector receiving at least a portion of those ions dispersed by the secondary electrostatic analyzer.

9. The accelerator mass spectrometry apparatus of claim 1, wherein the target is enclosed in an ultra high vacuum chamber.

10. The accelerator mass spectrometry apparatus of claim 1, wherein an angle of incidence between the portion of the beam of positive ions from the selector and the surface of the target is from approximately 1° to approximately 5°.

11. The accelerator mass spectrometry apparatus of claim 1, wherein the surface of the target includes a single crystal.

12. The accelerator mass spectrometry apparatus of claim 1, wherein a portion of the portion of the beam of positive ions converted to negatively charged ions is approximately 50 percent.

13. The accelerator mass spectrometry apparatus of claim 1, wherein the multicharged ion source produces ions having a charge of at least +3.

14. A method for performing accelerator mass spectrometry, comprising:

producing a beam of positive ions having different multiple charges from a multicharged ion source;

selecting positive ions having a charge state of from +2 to +4 from the beam of positive ions to define a portion of the beam of positive ions; and scattering at least a portion of the portion of the beam of positive ions off a surface of a target to directly convert a portion of the positive ions in the portion of the beam of positive ions to negative ions.

15. The method of claim 14, wherein at least a portion of the positive ions in the portion of the beam of positive ions from the multicharged ion source have a charge state of at least +3.

16. The method of claim 14, wherein selecting includes: selecting positive ions having a charge state of at least +3 from the beam of positive ions produced by the multicharged ion source with an analyzing magnet before scattering the portion of the beam of ions from a single crystal that composes the surface of the target.

17. The method of claim 16, wherein positive carbon ions having a mass 14 charge state of at least about +4 are selected.

18. The method of claim 14, further comprising:

electrostatically dispersing negative ions from the surface of the target, the negative ions dispersed such that negative ions having different charge states are dispersed into different regions.

19. The method of claim 18, further comprising:

electrostatically deflecting dispersed negative ions for further energy analysis.

20. An accelerator mass spectrometry apparatus, comprising:

a multicharged ion source for producing a beam of positive ions having different multiple charges, the multicharged ion source including an electron cyclotron resonance ion source that can be configured and operated under appropriate conditions to provide a beam of positive ions including ions having a charge state of at least +3;

a selector coupled to the electron cyclotron resonance ion source, the selector including analyzing magnet configured to select positive carbon ions having a charge state of from +3 to +4 from the beam of positive ions to define a beam of portion of positive ions;

an ultra high vacuum chamber coupled to the analyzing magnet, the ultra high vacuum chamber enclosing a target having a surface including a single crystal configured so that the portion of the beam of positive ions can be scattered and directly converted to negative carbon ions;

a primary electrostatic analyzer coupled to said ultra high vacuum chamber, the primary electrostatic analyzer configured to receive negative carbon ions from the surface of the target and disperse negative carbon ions having different charge states into different regions;

a secondary electrostatic analyzer coupled to said primary electrostatic analyzer, the secondary electrostatic analyzer configured to receive at least a portion of those carbon ions having negative charge as dispersed by the first electrostatic analyzer and disperse those carbon ions received from the primary electrostatic analyzer according to their kinetic energy; and a particle detector coupled to said secondary electrostatic analyzer, said particle detector configured to receive at least a portion of those carbon ions dispersed by the secondary electrostatic analyzer, wherein an angle of incidence between the portion of the beam of positive ions from the analyzing magnet and the single crystal of the surface of the target is from approximately 1° to approximately 5° and conversion of positive carbon ions from the portion of the beam of positive ions that is converted to negatively charged carbon ions is approximately 50 percent.

* * * * *

UNITED STATES PATENT AND TRADEMARK OFFICE
CERTIFICATE OF CORRECTION

PATENT NO. : 6,455,844 B1
DATED : September 24, 2002
INVENTOR(S) : Fred W. Meyer It is certified that error appears in the above-identified patent and that said Letters Patent is hereby corrected as shown below:

Column 8,
Line 4, insert -- an -- after including and before analyzing

Signed and Sealed this

Fourth Day of February, 2003

JAMES E. ROGAN
*Director of the United States Patent and Trademark Office*